(12) United States Patent
Sheu

(10) Patent No.: US 9,348,209 B2
(45) Date of Patent: May 24, 2016

(54) PORTABLE ELECTRONIC DEVICE HAVING PROJECTION UNIT

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 242 days.

(21) Appl. No.: 14/109,909

(22) Filed: Dec. 17, 2013

(65) Prior Publication Data

US 2014/0340657 A1    Nov. 20, 2014

(30) Foreign Application Priority Data

May 20, 2013    (TW) .............................. 102117810 U

(51) Int. Cl.
*G03B 21/00* (2006.01)
*G03B 21/28* (2006.01)

(52) U.S. Cl.
CPC ..................................... *G03B 21/28* (2013.01)

(58) Field of Classification Search
CPC ......... H04N 5/222; G03B 21/28; G03B 21/00
USPC ....................................................... 349/5, 6, 7
See application file for complete search history.

(56) References Cited

U.S. PATENT DOCUMENTS

| 6,028,649 A * | 2/2000 | Faris ................. G02B 27/0093 348/E13.004 |
| 2007/0153242 A1 * | 7/2007 | Sokolov ............... H04N 9/3141 353/119 |

* cited by examiner

*Primary Examiner* — Sultan Chowdhury
*Assistant Examiner* — Danell L Owens
(74) *Attorney, Agent, or Firm* — Novak Druce Connolly Bove + Quigg LLP

(57) ABSTRACT

A portable electronic device includes a main body, a display substrate, a projection unit, and a reflection film. The main body includes a first surface and defines a receiving cavity in the first surface. The displaying substrate is rotatably received in the receiving cavity. The displaying substrate includes a first projection surface and a second projection surface facing away from the first projection surface. The first projection surface is close to the receiving cavity. The projection unit is received in the receiving cavity. The reflection film is movably positioned on the second projection surface.

14 Claims, 4 Drawing Sheets

PORTABLE ELECTRONIC DEVICE HAVING PROJECTION UNIT

BACKGROUND

1. Technical Field

The present disclosure relates to portable electronic devices, and particularly to a portable electronic device having a projection unit.

2. Description of Related Art

Portable electronic devices usually have only one display substrate. If user wants to achieve a projection function, a projector needs to be added to electrically connect to the portable electronic device for projection. This is not only expensive, but also is inconvenient.

Therefore, it is desirable to provide a portable electronic device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
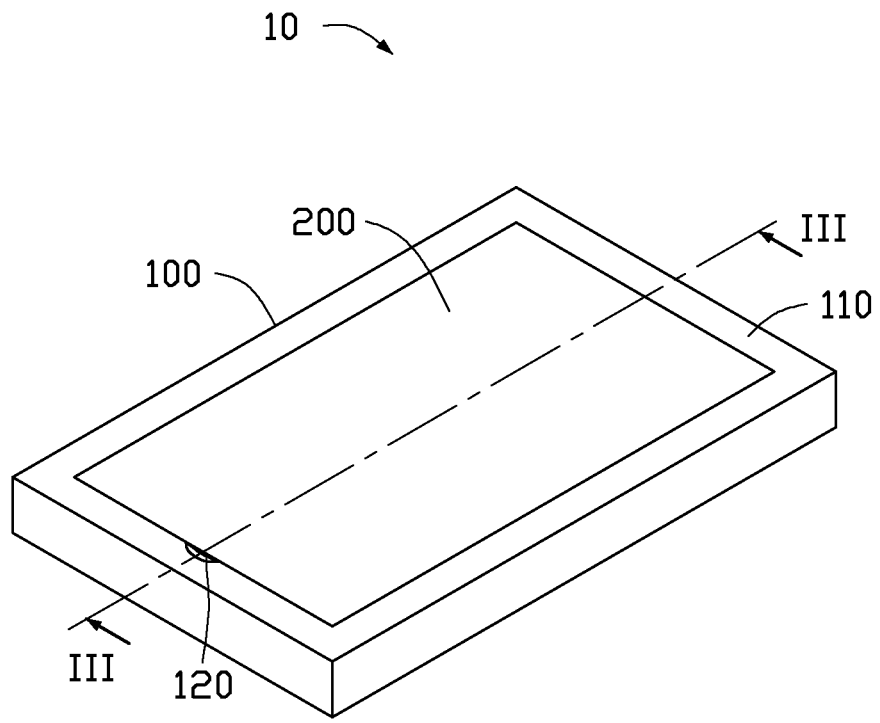
FIG. 1 is an assembled, isometric view of an embodiment of a portable electronic device.
Figure 2:
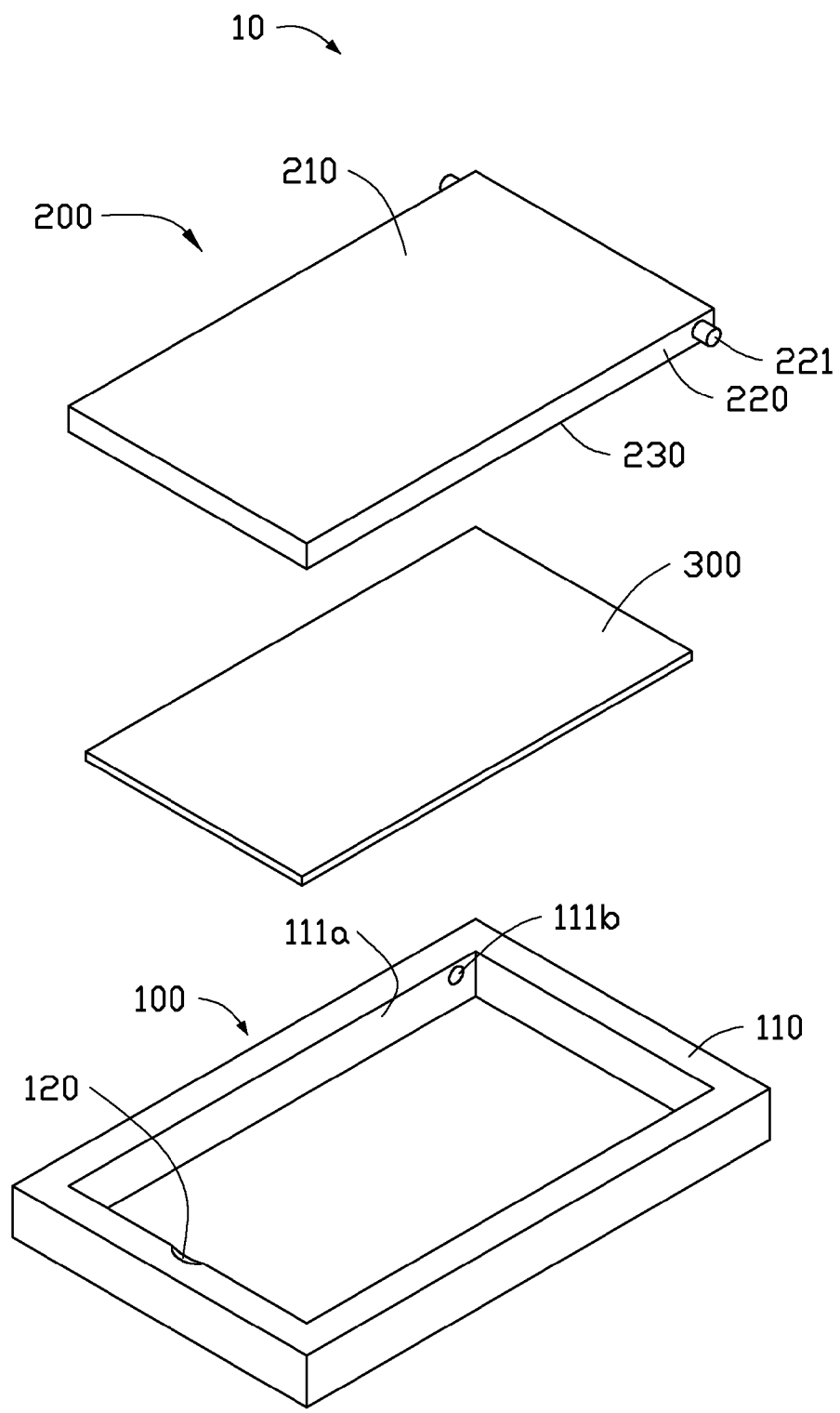
FIG. 2 is an exploded, isometric view of the portable electronic device of FIG. 1.
Figure 3:
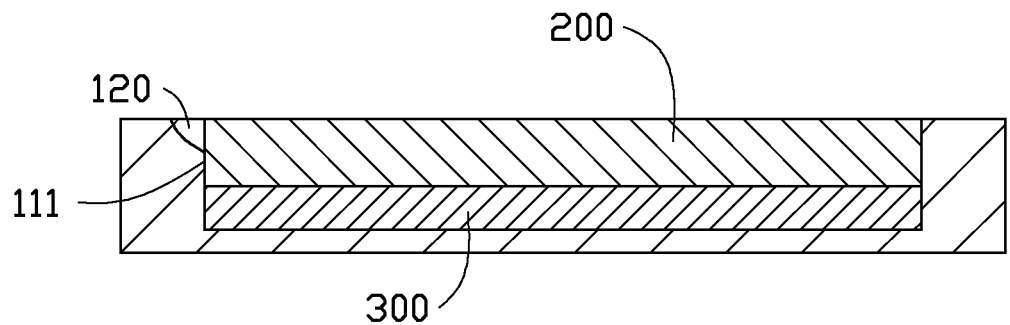
FIG. 3 is a cross-sectional view taken along line III-III of FIG. 1.
Figure 4:
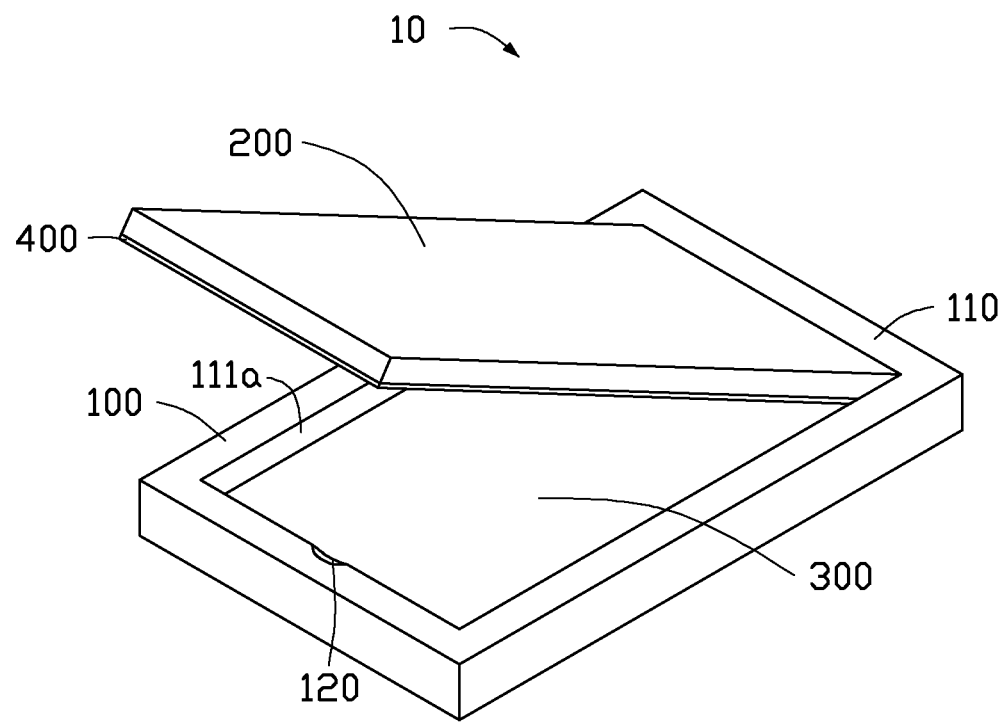
FIG. 4 is similar with FIG. 1, but shown in a use state.

FIGS. 1-4 show an embodiment of a portable electronic device 10. In one embodiment, the portable electronic device 10 includes a main body 100, a displaying substrate 200 rotatably received in the main body 100, a projection unit 300, and a reflection film 400. The portable electronic device 10 can be, but is not limited to, a mobile phone.

The main body 100 is substantially rectangular. The main body 100 includes a first surface 110. The first surface 110 defines a receiving cavity 111. In one embodiment, the receiving cavity 111 is also substantially rectangular. The main body 100 includes two opposite inner sidewalls 111a in the receiving cavity 111. Each inner sidewall 111a defines a shaft hole 111b. The main body 100 defines an open groove 120 in an end portion of the first surface 110 away from the shaft hole 111b. The open groove 120 communicates with the receiving cavity 111.

In one embodiment, the displaying substrate 200 is a transparent substrate and is substantially rectangular. The displaying substrate 200 includes a first projection surface 210, two side surfaces 220, and a second projection surface 230 facing away from the first projection surface 210. The two side surfaces 220 are substantially parallel to each other. The first projection surface 210 is substantially parallel to the second projection surface 230 and is close to the receiving cavity 111. Both the side surfaces 220 substantially perpendicularly connect the first projection surface 210 to the second projection surface 230.

The displaying substrate 200 is rotatably received in the receiving cavity 111. In particular, a shape and a size of the displaying substrate 200 correspond to a shape and a size of the receiving cavity 111, respectively. The displaying substrate 200 includes two rotation shafts 221 extending from the two side surfaces 220, respectively. Each rotation shaft 221 spatially corresponds to a shaft hole 111b. Each rotation shaft 221 is tightly received in a corresponding shaft hole 111b. As such, the displaying substrate 200 can rotate around the rotation shaft 221 and can be fixed at any position.

In one embodiment, the projection unit 300 is a laser projector, and is received in the receiving cavity 111.

The reflection film 400 is movably mounted on the second projection surface 230. The reflection film 400 can be, but is not limited to be movably mounted on second projection surface 230 by a static absorption method. A shape and a size of the reflection film 400 correspond to a shape and a size of the second projection surface 230. A total thickness of the displaying substrate 200, the reflection film 400 and the projection unit 300 is substantially equal to a thickness of the receiving cavity 111.

In use, when the portable electronic device 10 is not needed to project, the reflection film 400 is removed from the second projection surface 230. The display substrate 200 is totally received in the receiving cavity 111. Lights projected by the projection unit 300 enter the displaying substrate 200 through the second projection surface 230, and are displayed on the first projection surface 210. When the portable electronic device 10 needs to project, the reflection film 400 is positioned onto the second projection surface 230, the user rotates the displaying substrate 200 until a suitable angle is formed between the displaying substrate 200 and the first surface 110. Projected lights projected by the projection unit 300 beat onto the reflection film 400 positioned on the second projection surface 230, and then are reflected by the reflection film 400 to project the projected lights onto a screen (not shown).

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A portable electronic device, comprising:
   a main body comprising a first surface and defining a receiving cavity in the first surface;
   a displaying substrate rotatably received in the receiving cavity, the displaying substrate comprising a first projection surface and a second projection surface facing away from the first projection surface, the first projection surface close to the receiving cavity;
   a projection unit received in the receiving cavity; and
   a reflection film removably positioned on the second projection surface;
   wherein when the portable electronic device is not needed to project, the reflection film is removed from the second projection surface, the displaying substrate is totally received in the receiving cavity, the first projection surface is configured to display lights projected by the projection unit; when the portable electronic device is needed to project, the reflection film is positioned onto the second projection surface, the displaying substrate is rotated until a suitable projection angle is formed between the displaying substrate and the first surface, lights projected by the projection unit beat onto the reflection film positioned on the second projection surface, and then are reflected by the reflection film to project the projected lights.

2. The portable electronic device of claim 1, wherein the main body comprises two opposite inner sidewalls in the receiving cavity, each inner sidewall defines a shaft hole, the displaying substrate comprises two side surfaces, both the two side surfaces connect the first projection surface to the second projection surface, the displaying substrate comprises two rotation shafts respectively extend from the two side surfaces, each rotation shaft spatially corresponds to a shaft hole, the displaying substrate is capable of rotating around the rotation shafts.

3. The portable electronic device of claim 2, wherein each rotation shaft is tightly received in a corresponding shaft hole, and the displaying substrate is capable of being fixed at any position.

4. The portable electronic device of claim 2, wherein the receiving cavity is substantially rectangular, a shape and a size of the displaying substrate respectively correspond to a shape and a size of the receiving cavity, both the side surfaces substantially perpendicularly connect the first projection surface to the second projection surface.

5. The portable electronic device of claim 2, wherein the main body defines an open groove in an end portion of the first surface away from the shaft hole, the open groove communicates with the receiving cavity.

6. The portable electronic device of claim 1, wherein the displaying substrate is a transparent substrate.

7. The portable electronic device of claim 1, wherein the projection unit is a laser projector.

8. The portable electronic device of claim 1, wherein a shape and a size of the reflection film correspond to a shape and a size of the second projection surface, respectively.

9. The portable electronic device of claim 1, wherein a total thickness of the displaying substrate, the reflection film and the projection unit is substantially equal to a thickness of the receiving cavity.

10. The portable electronic device of claim 1, wherein the portable electronic device is a mobile phone.

11. A portable electronic device, comprising:
a main body comprising a first surface and defining a receiving cavity in the first surface;
a displaying substrate rotatably received in the receiving cavity, the displaying substrate comprising a first projection surface and a second projection surface facing away from the first projection surface, the first projection surface close to the receiving cavity;
a projection unit received in the receiving cavity; and
a reflection film movably positioned on the second projection surface;
wherein the main body comprises two opposite inner sidewalls in the receiving cavity, each inner sidewall defines a shaft hole, the displaying substrate comprises two side surfaces, both the two side surfaces connect the first projection surface to the second projection surface, the displaying substrate comprises two rotation shafts respectively extend from the two side surfaces, each rotation shaft spatially corresponds to a shaft hole, the displaying substrate is capable of rotating around the rotation shafts.

12. The portable electronic device of claim 11, wherein each rotation shaft is tightly received in a corresponding shaft hole, and the displaying substrate is capable of being fixed at any position.

13. The portable electronic device of claim 11, wherein the receiving cavity is substantially rectangular, a shape and a size of the displaying substrate respectively correspond to a shape and a size of the receiving cavity, both the side surfaces substantially perpendicularly connect the first projection surface to the second projection surface.

14. The portable electronic device of claim 11, wherein the main body defines an open groove in an end portion of the first surface away from the shaft hole, the open groove communicates with the receiving cavity.

\* \* \* \* \*